Sept. 6, 1966　　　　　A. W. WILSON　　　　　3,270,646
CAMERA ATTACHMENT AND CAMERA
Filed April 14, 1964　　　　　　　　　　　　　　4 Sheets-Sheet 1
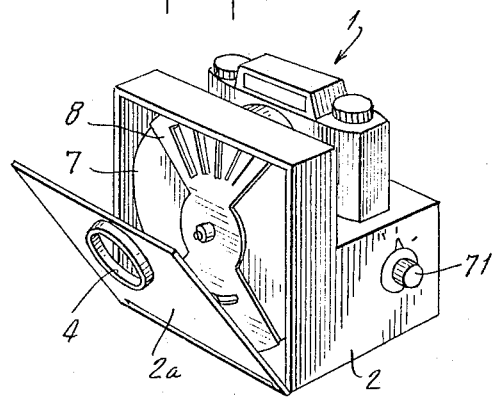
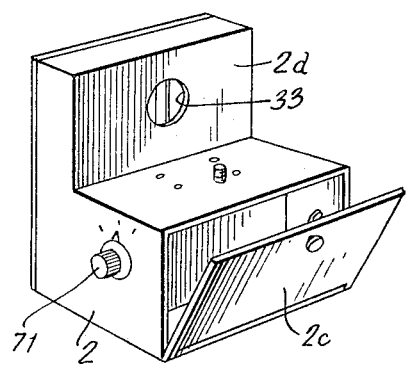
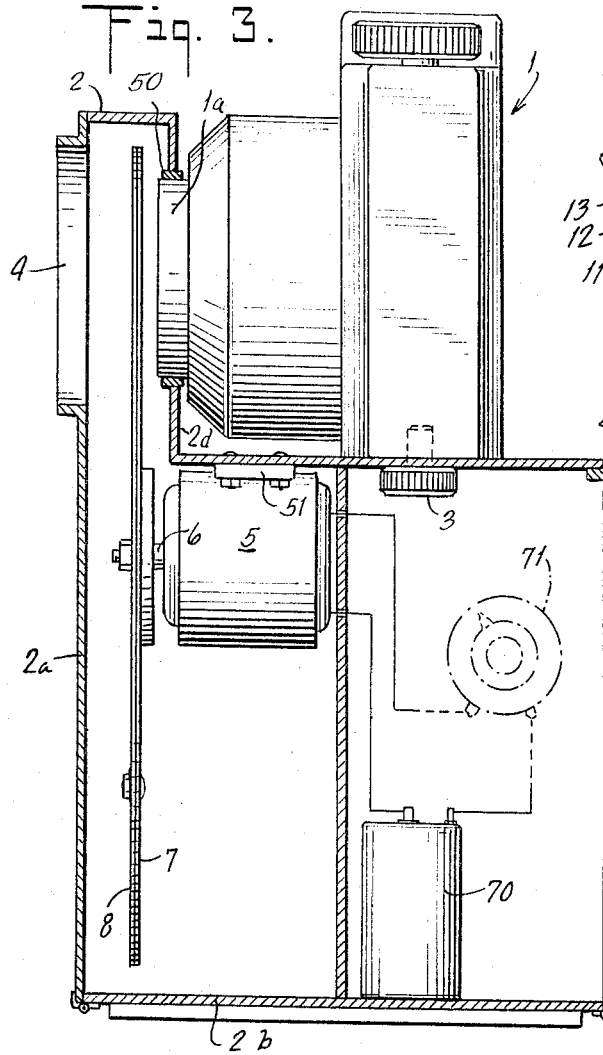
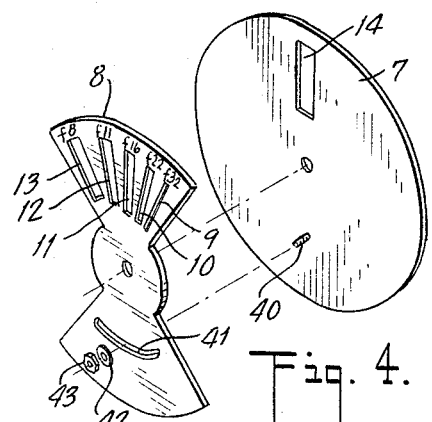
INVENTOR.
ALBERT W. WILSON
BY
R. Bradlee Boal
ATTORNEY Sept. 6, 1966  A. W. WILSON  3,270,646
CAMERA ATTACHMENT AND CAMERA
Filed April 14, 1964  4 Sheets-Sheet 2

INVENTOR.
ALBERT W. WILSON
BY
R. Bradlee Boal
ATTORNEY

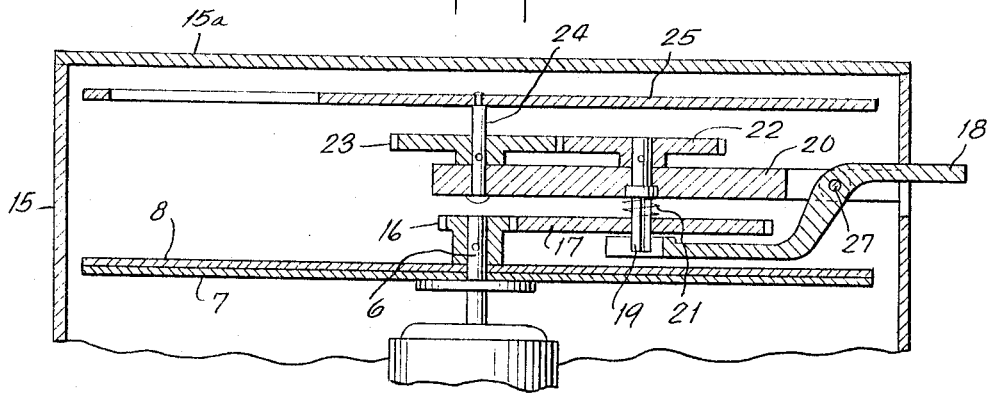
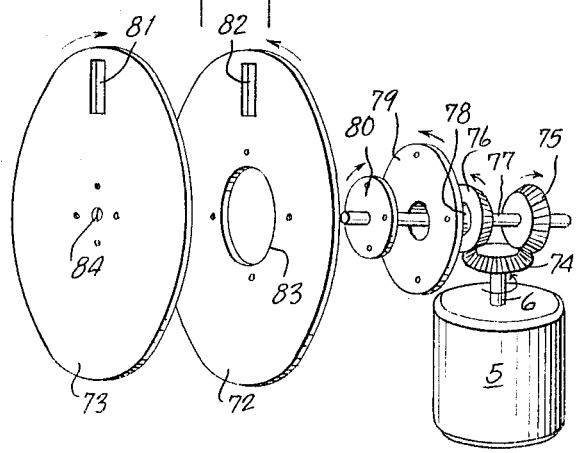
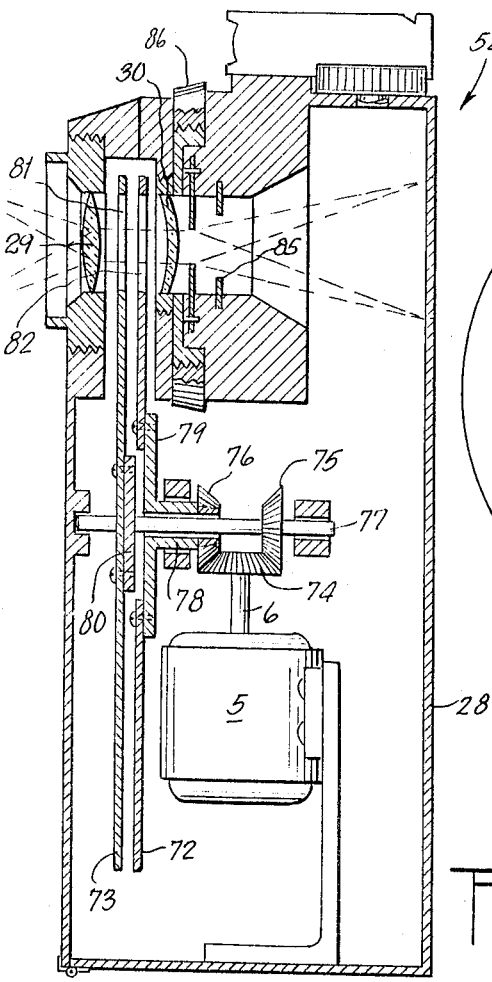

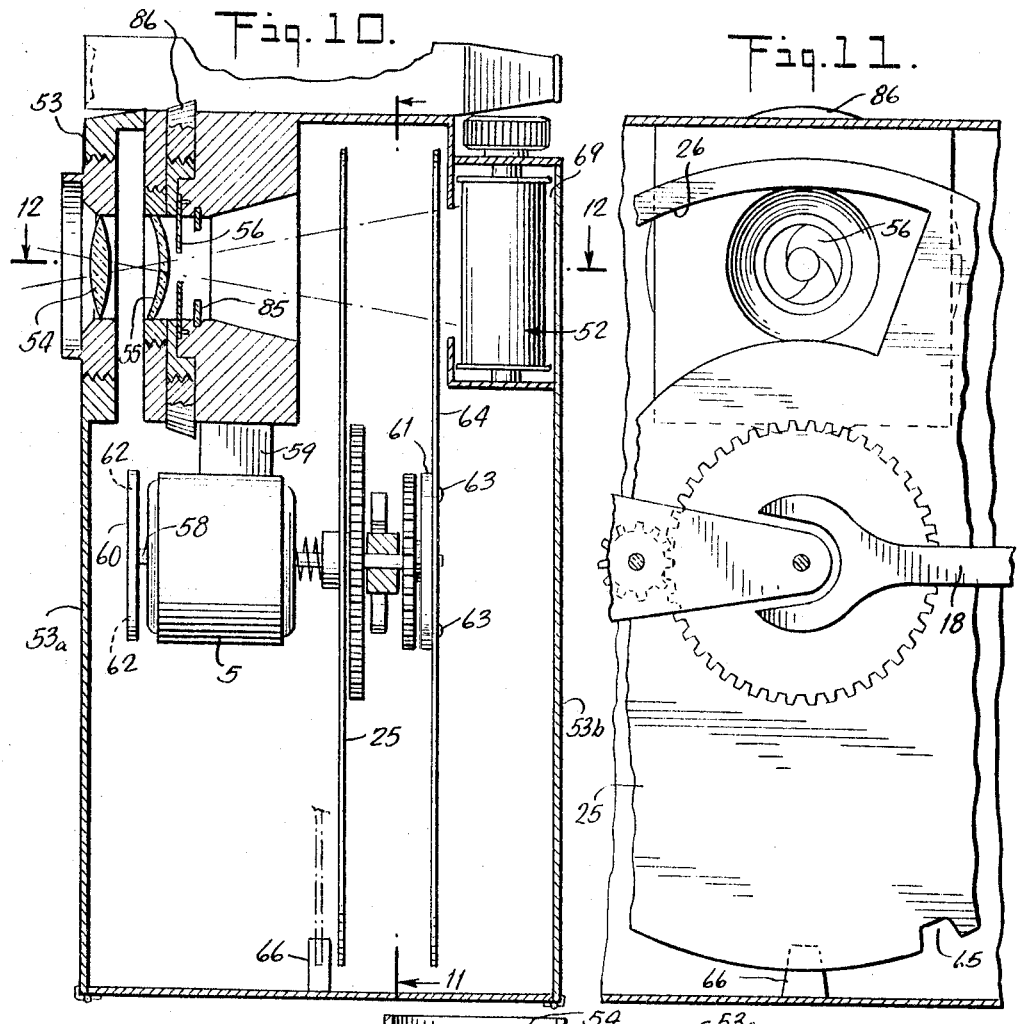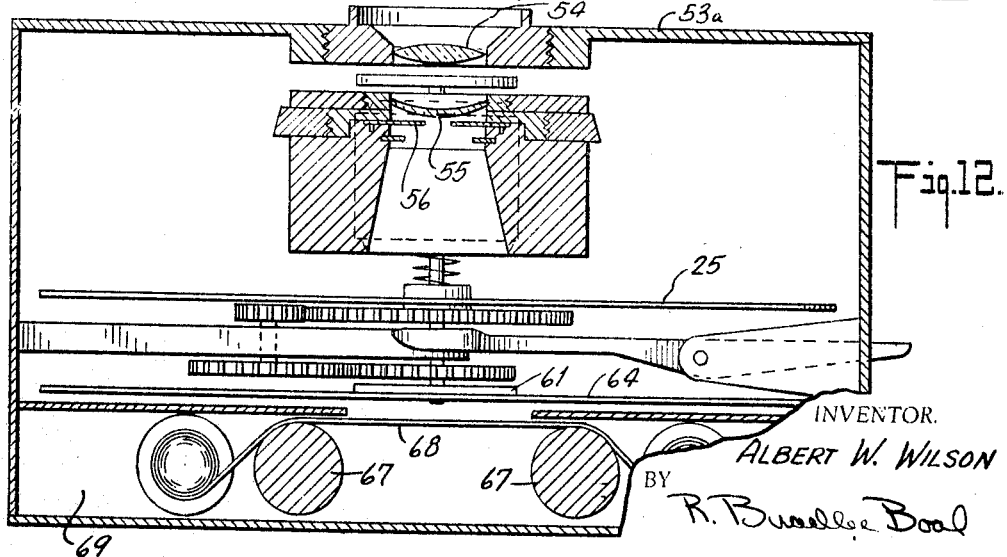

United States Patent Office 3,270,646
Patented Sept. 6, 1966

3,270,646
CAMERA ATTACHMENT AND CAMERA
Albert W. Wilson, Hout Bay, Cape Province, Republic of South Africa, assignor to Trenel Finance Corporation, Panama, Panama, a corporation of Panama
Filed Apr. 14, 1964, Ser. No. 359,799
13 Claims. (Cl. 95—36)

This invention relates to a camera attachment which greatly increases the effective shutter speed of a camera. The camera attachment of this invention may also be used to take multiple high speed exposures at regular intervals on a single negative.

The invention further relates to a camera which can take either single high speed exposures or multiple high speed exposures at regular intervals on a single negative.

It is often desirable to take high speed exposures, i.e., those of the order of 1/5000 of a second or faster, to "freeze" an object in motion whose speed is so great that the movement of the object is invisible to the human eye. Heretofore it has been possible to take such photographs only with very expensive equipment in daylight or in darkness with the aid of high speed flash equipment. Conventional cameras are incapable of obtaining shutter speeds of this order.

With the aid of the attachment of the invention described herein, effective shutter speeds in excess of 1/100,000 second may be attained with a conventional camera both in daylight and darkness with conventional illumination.

It has also been found that a camera which can take multiple high speed exposures at regular intervals on a single negative is of great value. For example, if the action of a golfer stroking a golf ball is captured on such a multiple high speed exposure, the movement of the golfer's limbs, head, body and the golf club itself may be clearly illustrated from start to finish of the stroke. With respect to many other types of fast moving objects, such as golf balls or bullets in flight similar useful photography may be obtained at close range with such a camera.

Heretofore it has been possible to take such multiple high speed exposures in darkness with multiflash stroboscopic flash equipment. With the aid of the attachment of the invention described herein, it is now possible to take multiple high speed exposures at regular intervals with a conventional camera in broad daylight and in darkness with conventional illuminating equipment.

In a preferred embodiment of the invention, the above results are attained to a high degree of efficiency in a unitary camera structure having the features hereinafter described.

Accordingly it is an object of this invention to provide a camera attachment which may be used with a conventional camera to greatly increase the effective shutter speed of the camera.

It is a further object to provide a camera attachment which may be used with a conventional camera to take a succession of high speed exposures at regular intervals in a single photograph.

It is a further object to provide a camera with a very high effective shutter speed.

It is a further object to provide a camera which can take multiple high speed exposures at regular intervals on a single photograph.

Other objects and advantages will become obvious to those skilled in the art from the following detailed description of the invention.

The above objects and advantages are achieved with a camera attachment which may be used; for example, with a conventional 35 millimeter camera. According to the invention, the camera is mounted on a lightproof housing. The housing is provided with an opening in its front wall in alignment with the camera lens and permits the transmission of light from the object to be photographed through the opening to the camera lens. A motor is mounted on the housing. The rotational speed of the motor is controlled by a potentiometer or rheostat. An opaque rotatable disc is mounted on the motor shaft. The disc has a radial slot disposed so that once during each rotation of the disc the slot comes into alignment with the opening in the housing wall and the camera lens. During the remaining period of each rotation the opaque portion of the disc interrupts the path of the light between the opening in the housing wall and the lens. By providing a relatively narrow slot, the period of effective exposure of the film during each revolution is relatively short. To use an example, if the disc has a two inch radius and hence is 12½ inches in circumference at the slot, and if the slot is 1/16 inch in width, the effective exposure time, which is equal to the distance travelled by the slot divided by the speed of travel, is $$\frac{\text{1/16 inch}}{12\text{½ in./rev.} \times \text{speed of rotation in revs./sec.}}$$

Where the speed of rotation is 100 revolutions per second, the effective exposure time is 1/20,000 of a second. Consequently, if the camera is set for a ½ second time exposure, 50 single exposures each of 1/20,000 of a second duration will be taken at regular intervals on a single negative. The number of single exposures on each negative may be varied by changing (1) the speed of rotation or (2) the total exposure time. If the speed of rotation is changed, the effective exposure time of each single exposure is also changed. Thus in the above example, if the speed of the motor is set at 25 revolutions per second, the total number of single exposures for a time exposure setting of ½ second will be 12 and the effective period of exposure for each single exposure will be 1/5000 of a second. From the above it is clear that a high degree of flexibilty with respect to the effective exposure time, the intervals between successive exposures, and the total number of high speed exposures on a single negative is attained in the attachment of this invention.

A second disc may be used in conjunction with the first disc described above to facilitate use of the attachment with a variety of f stops. The second disc has slots of varying width corresponding to the f stops of the camera, so that the lower f stops are used in conjunction with slots having wider widths and the higher f stops are used in conjunction with slots having narrower widths. When the particular f stop desired is selected, the slot corresponding to that f stop is aligned with the slot in the first disc and the two discs are then locked together.

The flexibility of the camera attachment described above may be further increased by employment of a third disc. The third disc is mechanically coupled to the motor shaft so that it is caused to rotate at a fraction of the speed of the first disc. If, for example, the gear ratio connecting the third disc with the motor shaft is one to four, the third disc will be caused to rotate at ¼ the speed of the first disc. Accordingly, if the third disc is provided with a quarter segment slot, only on every fourth rotation of the first disc will the slots of the first and second discs and the slot of the third disc be in alignment. If, for example, the first and second discs described above are set for a rotational speed of 100 revolutions per second and the time exposure setting is ½ second, the combination of discs will cooperate to produce 12 single exposures of 1/20,000 of a second duration. Thus, it may be seen that with the combination of the three discs, the effective speed of each single exposure (1/20,000 of a second) is the same and the intervals between successive single exposures are four times as long as with the use of the two disc arrangement. Accordingly, it may be seen that added flexibility is imparted to the camera attachment through the use of the third disc.

In place of the two disc arrangement described above, a series of interchangeable discs may alternatively be used. Each disc is provided with a slot of width corresponding to a particular $f$ stop, and the disc is selected to correspond to the $f$ stop desired. Each time the $f$ stop is changed a different disc is used. Other discs may be used which have a plurality of slots. Such discs are particularly useful where it is desired to increase the number of exposures for a given time setting without decreasing the effective exposure time of each single exposure. For example, if the exposure time achieved with a motor speed of 100 revolutions per second is suitable for the object photographed, and it is desired to have 200 exposures within a one-half second time period, a disc with four radial slots could be used.

While in the above examples certain specific rotational speeds, disc dimensions, slot dimensions, and number of slots per disc have been given, it may be readily understood that no specific set of dimensions is critical to this invention and that any number of different combinations of disc size, speed of rotation, number of slots per disc, and slot widths may be used to achieve the above results and fall within the scope of this invention.

With the camera attachment described above, the discs are disposed in front of the front lens of the camera. While the results produced with such an arrangement are highly satisfactory for most purposes, it has been found that more efficient photographs may be taken with the discs disposed either (a) between the lenses of the camera or (b) at the focal plane of the camera, the choice between the two being dependent on several factors including the optical qualities of camera lens, and the nature of the object to be photographed. It is believed that the most efficient photographs can be obtained by cutting the coned rays of light transmitted from the object at their smallest diameter. For this reason, when the image of the object at the focal plane is smaller than the camera aperture it is better to position the discs at the focal plane. On the other hand, when the image of the object at the focal plane is larger than the aperture, it is better to position the discs between the lenses.

In the preferred embodiment of the invention, the above features are attained in a camera which is provided with a motor having a motor shaft on which discs of the type described above may be mounted either approximately at the focal plane or between the lenses of the camera. The camera of the invention has its iris shutter and aperture located closely behind the rear lens of the camera to provide space for the rotating discs between the lenses. If roll type film is used, two freely rotating cylinders may be used to bring the film forward to a position in the film chamber as close to the rotating discs as possible.

The above camera is operated in substantially the same way as the camera and camera attachment described above. The primary difference resides in the fact that the discs of the camera attachment pass before the front lens of the camera whereas the discs of the camera may either pass between the lenses or at the focal plane of the camera.

In the drawings:

FIG. 1 shows a view in perspective of the camera attachment of this invention together with a conventional camera mounted thereon.

FIG. 2 shows a view in perspective from the rear of the camera attachment shown in FIG. 1.

FIG. 3 shows a vertical section of the camera and camera attachment of FIGS. 1 and 2.

FIG. 4 shows two discs which may be used with the camera attachment of FIGS. 1 and 2.

FIG. 8 shows a horizontal section of the gear assembly shown in FIG. 7 taken along line 8—8 of FIG. 7.

FIG. 9A shows a camera embodying the invention in which the discs are disposed between the lenses of the camera.

FIG. 9B shows the gear and mounting arrangement of the camera of FIG. 9A.

FIG. 10 shows a camera embodying the invention in which the discs may be disposed either at the focal plane or between the lenses of the camera.

FIG. 11 shows a vertical section of the camera shown in FIG. 10 taken along line 11—11 of FIG. 10.

FIG. 12 shows a cross-sectional view of the camera shown in FIG. 10 taken along line 12—12 of FIG. 10.

FIGS. 1 to 4

Figure 5:
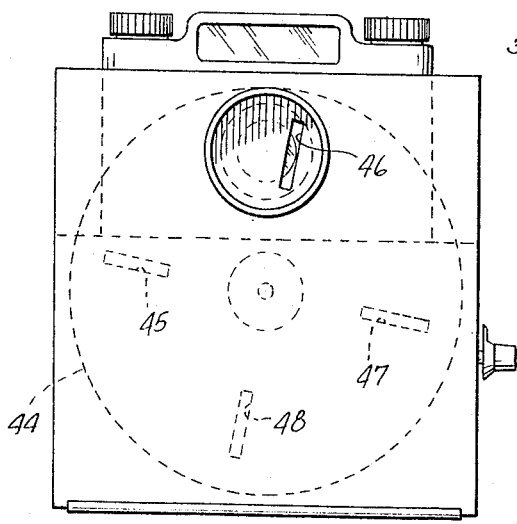
FIG. 5 shows a front elevation of the camera attachment shown in FIGS. 1 and 2, together with an alternative type of disc which may be used with the attachment.

FIG. 3 shows camera 1 with a camera lens 1a mounted on a housing 2. Camera 1 is secured to housing 2 by a thumb screw 3 which projects upwardly from the camera housing and which is threadedly received into the base portion of the camera. When camera 1 is so secured, the camera lens 1a is received in an opening 33 in wall 2d of housing 2. Housing 2 may be provided with a lining of flexible lightproof material 50, e.g. velvet around the periphery of opening 33 to provide a light seal. Housing 2 includes a front wall 2a and a rear wall 2c which are respectively hinged to base wall 2b, said hinged walls permitting easy access to the interior of the housing. Front wall 2a has an opening 4 disposed opposite the lens 1a of camera 1. Except for opening 4, housing 2 is substantially lightproof. A motor 5 having a shaft 6 is mounted on a bracket 51 which is in turn mounted on housing 2. Discs 7 and 8 are mounted on shaft 6. As seen in FIG. 4, disc 8 has a series of radial slots ranging from those of relatively small width to those of relatively large widths representing the various focal stops of the camera. Slot 9 represents $f32$; slot 10 $f22$; slot 11 $f16$; slot 12 $f11$, and slot 13 $f8$.

As shown in FIGS. 3 and 4, disc 7 has a single radial slot 14. Slot 14 is wider than the widest slot in disc 8. Disc 7 and disc 8 may be locked together when the proper slot in 8 has been selected and aligned with slot 14 by suitable means, as for example, by the combination of stud 40, slot 41, washer 42 and nut 43 shown in FIG. 4.

Motor 5 may be connected to a suitable source of power 70. A nine volt battery has been found to be satisfactory for the purposes of this invention. A potentiometer 71 is connected in series with the source of power and the motor and provides means for varying the speed of rotation of motor 5.

Operation of FIGS. 1 to 4

With the camera 1 firmly secured to housing 2 by means of screw 3, the slot of disc 8 may be selected to represent the $f$ stop required by the photographic conditions present. For example, if the photographic conditions suggest that optimum results will be obtained with a setting of $f11$, slot 12 is selected. Slots 12 and 14 are then aligned and discs 7 and 8 locked together. The motor 5 is then started and its speed adjusted by potentiometer 16 to the rate desired. The selection of the proper speed varies according to speed of movement of the object, its distance from the camera, and the speed of the film. The exposure time may then be set as desired. For example, if it is desired to take only a single exposure and the motor speed is 100 revolutions per second, the exposure time should be set for 1/100 of a second. Correspondingly if it is desired to take 25 exposures at the same speed the exposure time should be set for 1/4 second.

It may readily be appreciated that with the above described embodiment of the invention the use of a high speed film is essential. It has been found that satisfactory pictures may be obtained using film of ASA 400, 800 or 1200 even where the effective exposure time is 1/100,000 of a second or greater.

FIG. 5

FIG. 5 shows disc 44 which may be used as an alternative disc to discs 7 and 8 of FIGS. 1 to 4. Disc 44 has four radial slots 45, 46, 47 and 48 of uniform size and consequently the film is exposed 4 times during each revolution of the disc with the period between successive exposures being correspondingly reduced. Since the disc mounted on shaft 6 may be freely substituted one for the other, disc 44 may be used as a substitute for the combination of discs 7 and 8.

While the disc 44 has four slots, it may readily be appreciated that more than four may be provided with the width of the slot in any disc may be made to represent any desired aperture.

Figure 6:
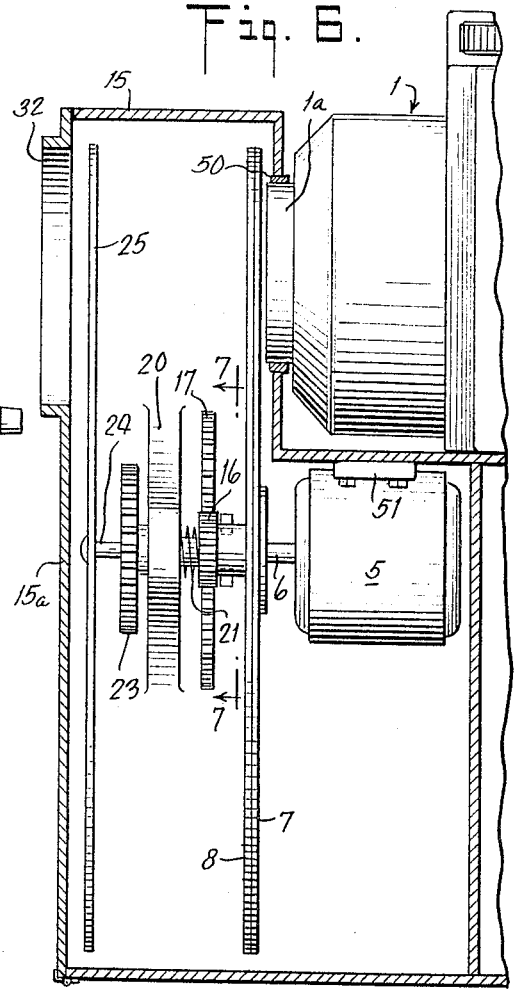
FIG. 6 shows a cut view of a modification of the camera attachment shown in FIGS. 1 and 2.
Figure 7:
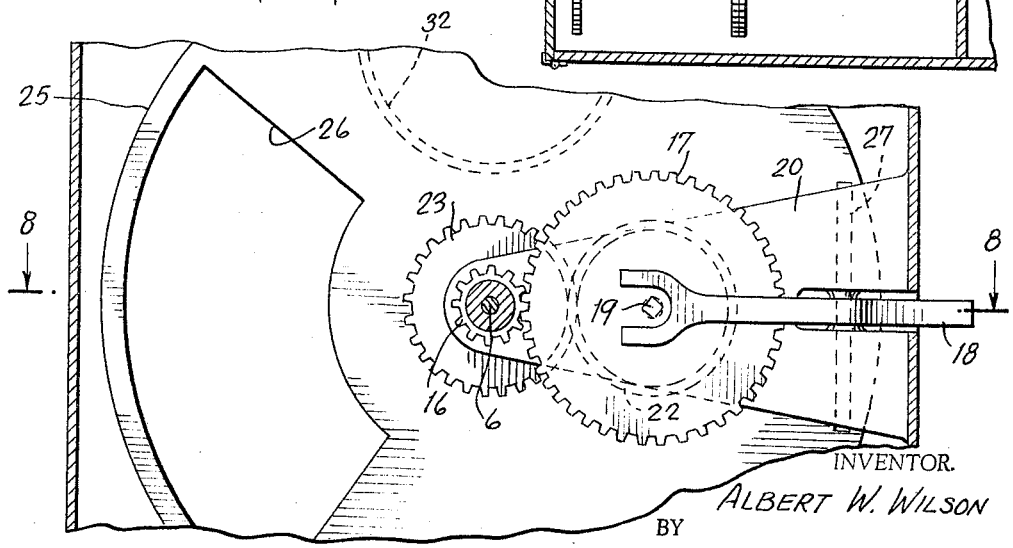
FIG. 7 shows a vertical section of the disc and gear assembly of FIG. 6 taken along line 7—7 of FIG. 6.

FIGS. 6 to 8

FIGS. 6 to 8 show a modified form of the invention shown in FIGS. 1 to 4. In the modification, the elements which are the same as those in the embodiment shown in FIGS. 1 to 4 are given identical numbers. In FIG. 6 the housing 15 is of somewhat greater depth than housing 2 in order to house additional apparatus described in more detail below. Housing 15 is provided with an opening 32 in its front wall 15a which is aligned with the lens 1a of camera 1.

Toothed gear 16 is mounted on shaft 6. In FIG. 7 gear 16 is shown engaging a larger toothed gear 17. Gear 17 is mounted on a shaft 19 which in turn is journaled in a support 20, and is slidable between an "engage" position and a "disengage" position with respect to gear 16. A spring 21 disposed between gear 17 and support 20 biases gear 17 into the "engage" position. A toothed gear 22 is mounted on shaft 19 and engages toothed gear 23. Gear 23 is mounted on shaft 24 which in turn is journaled in support 20. An opaque disc 25 is also mounted on shaft 24. FIG. 7 shows a frontal view of disc 25. Disc 25 has a quarter segment cut out 26. A lever 18 is mounted on a pivot 27 which in turn is mounted on support 20 and may be pivotally moved to control the slidable movement of gear 17 between its "engage" position and "disengage" position. When in the "disengage" position, it presses against gear 17 to overcome the bias of spring 21 and causes gear 17 to disengage from gear 16. When in the "engage" position, lever 18 permits gear 17 to engage gear 16. Gears 22 and 23 have a 1 to 1 ratio and gears 16 and 17 have a 1 to 4 ratio. When the gears are in the engage position, disc 25 rotates at 1/4 the speed of discs 7 and 8.

Like discs 7 and 8, disc 25 is of opaque material. Housing 15 like housing 2 is of lightproof material.

Operation of FIGS. 6 to 8

When lever 18 is in the "disengage" position, the camera attachment shown in FIGS. 6 to 8 operates in substantially the same manner as the camera attachment of FIGS. 1 to 4. However, when lever 18 is in the "engage" position, gear 16 drives gear 17. Gear 16 and discs 7 and 8, all being mounted on shaft 6, revolve at the same speed. Because the gear ratio of gears 16 and 17 is 1 to 4, gear 17 revolves at 1/4 the speed of gear 16. Gear 17 is coupled through gears 22 and 23 to shaft 24 so that shaft 24 revolves at 1/4 the speed of discs 7 and 8. Consequently, disc 25 which is mounted on shaft 24 travels at 1/4 the speed of discs 7 and 8. Thus only on every fourth revolution of discs 7 and 8, does the quarter segment cut out 26 of disc 25 coincide with the aligned slots in discs 7 and 8. Therefore, when the camera is set for a 1/2 second time exposure and the motor speed is 100 revolutions per second, the effective exposure time of each single exposure is 1/20,000 of a second, and the total number of single exposures is 12.

By the use of the embodiment shown in FIGS. 6 to 8 added flexibility in the number of single exposures for a given time period is achieved without decreasing the rotational speed of the motor and consequently without affecting the effective exposure time of each single exposure.

FIGS. 9A and 9B

FIGS. 9A and 9B show a preferred embodiment of the invention in which the features of the invention found in the attachment of the above described embodiments are incorporated into a unitary camera structure combined with an arrangement of gears which causes the discs to rotate in opposite directions. In this embodiment those elements which are the same as those in the above described embodiments are given identical designations. In FIG. 9A the camera, generally indicated at 52, comprises a camera housing 28 and a compound lens system composed of front lens 29 and rear lens 30. Discs 72 and 73 are disposed between the front lens 29 and the rear lens 30. The front lens 29 acts as a converger and condenses the light rays so that they may pass through the aperture. Since the discs are positioned between the lenses, they cut the beam after it has been condensed. Consequently, the efficiency is greater than if the beam is cut prior to passing through the front lens 29.

FIG. 9A shows a bevel gear 74 mounted on shaft 6 of motor 5. Bevel gear 74 is disposed in driving relation with bevel gears 75 and 76. Bevel gear 75 is mounted on axle 77 and bevel gear 76 is mounted on axle 78. As shown in FIG. 9B, bevel gears 75 and 76 are so disposed with respect to bevel gear 74 that they rotate in opposite direction. Axle 77 passes through axle 78, and the axles are disposed so as to permit rotation in opposite directions. Bevel gears 75 and 76 are identical in structure so that axles 78 and 77 rotate at the same speed but in opposite directions. Disc mounting plate 79 is affixed to the end of axle 78, and disc mounting plate 80 is affixed to axle 77. The diameter of disc mounting plate 80 is smaller than the diameter of disc mounting plate 79. Discs 73 and 72 may be mounted respectively on disc mounting plates 80 and 79 with any suitable means. Discs 72 and 73 have identical slots 81 and 82, but disc 72 has a larger central hole 83 than the central hole 84 of disc 73 so that disc 72 may be passed over disc mounting plate 80 to facilitate attachment and removal thereof.

FIGS. 10 to 12

In FIGS. 10 to 12 a preferred embodiment of the unitary camera structure of the invention is shown. In this embodiment, those parts which are substantially the same as parts previously described are given like numbers.

Housing 53 is provided with hinged front and rear walls 53a and 53b. The camera is provided with a lens system including front lens 54 and rear lens 55. Diaphragm 56 and shutter 85 are located closely behind the rear lens 55. Control ring 86 controls the setting of diaphragm 56. A motor 5 having a shaft 58 is mounted on a bracket 59 which is in turn mounted on housing 53 (means for mounting not shown). Shaft 58 is provided with front and rear disc mounting plates 60 and 61. Plates 60 and 61 are provided with threaded recesses 62 for receiving screws 63. Disc 64 may be secured to either front plate 60 or rear plate 61 by means of screws 63. When disc 64 is secured to the front plate 60, it is disposed between the lenses of the camera.

Disc 25, having a quarter segment slot as described above in connection with FIGS. 6 to 8, may also be mounted on shaft 58. Disc 25 is provided with a notch 65. Notch 65 engages stop 66 as shown in dotted lines in FIG. 10 when lever 18 is in the "disengaged" position.

As may be seen in FIG. 11 notch 65 is located opposite the quarter segment slot 26 of disc 25. Thus when lever 18 is in the "disengage" position stop 66 and notch 65 holds disc 25 in a position which permits light to pass from the object through slot 26 at all times. The nature and function of disc 25 in the camera of FIGS. 10 to 12 is substantially the same as in FIGS. 6 to 8 and will not be further discussed herein.

In order that the location of disc 44 when mounted on rear plate 61 and the focal plane may be as nearly coincident as possible, freely rotating rollers 67 are provided to guide the film 68 to the forward most portion of film chamber 69'.

If it is desired to place the disc 64 between the lenses it is merely necessary to open rear wall 53b, detach disc 64 from rear plate 61, open front wall 53a and attach disc 64 to front plate 60.

The operation of the camera of FIGS. 10 to 12 is substantially the same as that of the other embodiments of the invention and will not be here repeated.

Whether disc 64 is to be disposed between the lenses or at the focal plane is determined by the object to be photographed. The size of the image at the focal plane may be computed from its actual size in relation to the width of the picture plane or alternatively from the known focal length of the camera. Since the efficiency of the invention is highest if the rays of light transmitted from the object are cut at their smallest diameter, small objects, e.g. bullets, golfballs, etc., whose image is much smaller at the focal plane than between the lenses are photographed more efficiently with the discs disposed at the focal plane. Conversely, if the object to be photographed is relatively large such as a man swinging a golf club, the image at the focal plane is likely to be nearly as large as the width of the focal plane and greater accuracy will be achieved by disposing the disc between the lenses.

Where a disc is disposed at the focal plane, the disc selected should have a slot width greater than the image of the object at the focal plane to insure minimum distortion.

Generally the $f$ number is set at the highest $f$ number which enables the object to remain within the depth of field through its passage across the picture plane. However, the optimum $f$ number may have to be determined by trial and error.

Where the disc is disposed between the lenses the aperture is set at the lowest $f$ number which will permit satisfactory exposure. The disc selected should have a slot width equal to the width of the aperture.

When the disc is disposed in front of the front lens as described above, as a general rule, the width of the slot should be equal to the width of the light rays at the place of intersection. Since the optimum relation between the slot width and the aperture depends on the distance between the disc and the aperture, it will vary from camera to camera. In practice it has been found that with an embodiment such as described above good results can be obtained if the slot is approximately 15% wider than the aperture. To described the above relationship between the slot and the aperture, the word "represent" has been used herein, e.g., "slot 9 represents $f32$."

The disc may be opaque metal or plastic or the like. The slot width may vary in size from approximately $\frac{1}{4}$ inch down to approximately $\frac{1}{128}$ inch, although it may readily be seen that for some cameras the slots may be wider or narrower than the range given. The length of the slot should be such that when the disc is disposed at the focal plane every point on the film is exposed. It is preferable that the discs be balanced to insure smoothness and efficiency of operation.

While in the above described embodiments, it has been suggested that the attachment may be used with a conventional 35 mm. camera, the invention is not limited in its application to 35 mm. cameras but may be used with many other types of cameras.

In the embodiment shown in FIGS. 6 to 8, the speed of rotation of the third disc is described as $\frac{1}{4}$ that of the other two discs. This ratio has been chosen for illustrative purposes only. Other gear ratios may be used with similar effects. For example, if the ratio of 1 to 3 is used and a one-third segment cutout is used the number of single exposures will be $\frac{1}{3}$ that attained without its use. Similarly a second motor might be used to drive the third disc and by the appropriate selection of the motor speeds and disc cutout segments a variety of different ratios may be obtained. Correspondingly, a variety of different intervals between successive exposures may be attained with such an arrangement.

While we have shown an described certain preferred embodiments of our invention, other modifications thereof will readily occur to those skilled in the art and we therefore intend our invention to be limited only by the appended claims.

I claim:
1. A camera for taking high speed exposures comprising:
    (a) a housing;
    (b) a compound lens system disposed within the housing;
    (c) a motor secured to the housing and having a motor shaft;
    (d) front plate mounting means disposed on the motor shaft;
    (e) rear plate mounting means disposed on the motor shaft; and
    (f) an opaque rotatable disc having at least one radial slot mountable on the mounting means and movable between the front plate mounting means and the rear plate mounting means;
    said front plate mounting means being disposed so that when the disc is mounted thereon it is disposed between the lenses of the compound lens system and said slot of the disc is optically aligned with the lenses and the light sensitive film of the camera once during each rotation of the disc, the opaque disc interrupting passage of light from the lenses to the light sensitive film during the remainder of each rotation;
    said rear plate mounting means being disposed so that when the disc is mounted thereon, it is disposed approximately at the focal plane of the camera, and said slot of the disc is optically aligned with the lenses and the light sensitive film of the camera once during each rotation of the disc, the opaque disc interrupting passage of light from the lenses to the light sensitive film during the remainder of each rotation.
2. An attachment to be used with a camera having a series of aperture settings for increasing the effective shutter speed of the camera comprising:
    (a) a substantially light proof housing having a front opening and means for securing the camera to the housing so that the front opening is optically aligned with the lens system of the camera;
    (b) a first opaque rotatable disc disposed within the housing in front of the camera so as to interrupt the passage of light rays from the object to be photographed to light sensitive film within the camera, said disc having a series of slots of progressively varying sizes, the size of the slots bearing a preselected relation to the size of the apertures for the aperture settings of the camera, said slots being disposed to permit passage of said light rays through the slot; and
    (c) means for rotating the disc;
    (d) a second opaque rotatable disc disposed within the housing in front of the camera so as to interrupt the passage of light rays from the object to be photographed to light sensitive film within the camera, said disc having a slot of size at least about equal to the size of the largest slot in the first disc and disposed so as to permit said passage of light rays through the slot;

(e) means for selectively locking the first opaque disc to the second opaque disc so that any slot in the first opaque disc may be aligned with the slot in the second opaque disc during rotation of the discs and whereby light from the object to be photographed passes through the discs only once during each rotation of the discs.

3. An attachment as defined in claim 2 in which the preselected relation is such that the size of the slots is at least about equal to the size of the cone of light rays from the object to be photographed at the place of interruption.

4. An attachment to be used with a camera having a lense system and a series of aperture settings for taking high speed multiple exposures at regular intervals on a single negative comprising:
(a) a substantial light proof housing having a front opening and means for securing the camera to the housing so that the opening is optically aligned with the lens system of the camera;
(b) a motor secured to the housing;
(c) a first opaque rotatable disc disposed within the housing between the lens system and the front opening and mounted on the motor shaft, said disc being disposed so as to interrupt the passage of the cone of light rays from the object to be photographed to the light sensitive film of the camera, said first rotatable disc having a series of radial slots of varying size disposed so as to permit light to pass through the slots to strike the film when the slots are in optical alignment with said cone of light rays, said series of slots bearing a preselective relation to the varying sizes of the apertures of the camera, the preselected relation being such that the size of the slot is equal to the size of the envelope of light rays from the object to be photographed at the place of interruption;
(d) a second opaque rotatable disc having a single radial slot, said slot having a size at least as great as the size of the largest slot in the first disc;
(e) means for selectively locking the first opaque disc to the second opaque disc so that any slot in the first opaque disc may be aligned with the slot in the second opaque disc during rotation of the discs and whereby light from the object to be photographed passes through the discs only once during each rotation of the discs, and
(f) means for advancing the film in the camera so as to permit multiple exposure of the negative to the light rays.

5. A camera having a series of aperture settings for taking multiple high speed exposures at regular intervals on a single negative:
(a) a first opaque rotatable disc having a series of slots of progressively varying sizes bearing a predetermined relation to the size of the series of apertures of the camera, the said rotatable disc disposed within the camera so as to interrupt the passage of light from an object to be photographed to the light sensitive film of the camera, each of said slots permitting the passage of light toward the film during rotation of the disc;
(b) a second opaque rotatable disc having a slot of size equal to the size of the largest slot in the first disc;
(c) means for selectively locking the second disc to the first disc so that the slot in the second disc may be aligned with any of the slots in the first disc during rotation;
(d) means for rotating the disc;
(e) means for holding the negative stationary for a substantial number of revolutions for said discs so as to permit a substantial number of exposures of the same segment of film to the light from the object to be photographed.

6. A camera as defined in claim 5 in which the lens system of the camera comprises a converging lens and the discs are disposed between converging lens and the remainder of the compound lens system so that the rays of light are cut by the disc after they have been condensed by the converging lens.

7. A camera as defined in claim 6 in which the predetermined relation is such that the size of the series of slots is equal to the size of the series of apertures of the camera.

8. A camera as defined in claim 5 in which the discs are disposed at approximately the focal plane of the lens system and the discs interrupt the passage of light at approximately said focal plane.

9. A camera as defined in claim 8 in which the predetermined relation is such that the size of the slots are equal to the size of the envelope of light rays from the object to be photographed at the focal plane.

10. A camera for taking high speed exposure comprising:
(a) a housing;
(b) a lens system disposed within the housing;
(c) a motor secured to the housing and having a motor shaft which extends forwardly and rearwardly from the motor;
(d) a front plate mounting means disposed forwardly of the motor on the motor shaft;
(e) a rear plate mounting means disposed rearwardly of the motor on the motor shaft; and
(f) a rotatable disc having at least one radial slot and mountable on either the front plate mounting means or the rear plate mounting means and movable between them;
said front plate mounting means disposed so that when the disc is mounted thereon the disc is disposed in proximity to the lens system and the slot is optically aligned with the lens system and the camera film once during each rotation of the disc, the opaque portion of the disc interrupting passage of light rays from the object to be photographed during the remainder of each rotation;
said rear plate mounting means disposed so that when the disc is mounted thereon it is disposed approximately at the focal plane of the camera and the slot of the disc is optically aligned with the lens system and the light sensitive film of the camera once during each rotation of the disc, the opaque portion of said disc interrupting the passage of light from the object to be photographed to the film during the remainder of each rotation.

11. A camera for taking multiple high speed exposures on a single negative comprising:
(a) a housing;
(b) a lens system disposed within said housing;
(c) a rotatable opaque disc having a plurality of slots of progressively varying sizes, so that each one of said slots bears a precise predetermined optical relationship to the various apertures of the camera, said disc being disposed so as to interrupt the passage of light rays from the object to be photographed to the light sensitive film of the camera;
(d) a second rotatable opaque disc having a slot equal in size to the largest of the slots in said first disc, and means for selectively locking the second disc to said first disc so that the slot in the second disc may be aligned with any one of the slots in said first disc;
(e) a third opaque disc having a radial slot with a width bearing a predetermined ratio to the circumference of the disc, said third disc rotatable at a speed bearing the same predetermined ratio to the speed of said first and second discs, said third disc disposed so as to interrupt the passage of light rays from the object to be photographed to the light sensitive film of the camera;

(f) means for stopping the rotation of said third disc so that the slot of said third disc, when stopped, is aligned with the path of the light from the object to be photographed to the light sensitive film; and (g) means for holding the light sensitive film stationary for a substantial number of revolutions of said discs so as to permit a plurality of exposures.

12. A camera as defined in claim 11 in which said first and second discs are located at the focal plane of said lens system.

13. A camera as defined in claim 11 in which said lens system comprises a plurality of lenses and said first and second discs are disposed between the lenses of said lens system so that the slots of said discs are aligned with said lenses during the rotation of said discs.

References Cited by the Examiner

UNITED STATES PATENTS

| | | | |
|---|---|---|---|
| 2,383,381 | 8/1945 | Hammond | 95—61 |
| 2,460,163 | 1/1949 | Bowen | 95—36 |
| 2,474,323 | 6/1949 | Rattray | 95—12.5 |
| 2,742,834 | 4/1956 | Kondolf | 95—61 X |
| 3,114,306 | 12/1963 | Nieuwenhaven | 95—61 X |

JOHN M. HORAN, *Primary Examiner.*